US012565981B1

(12) United States Patent
Yang et al.

(10) Patent No.: US 12,565,981 B1
(45) Date of Patent: Mar. 3, 2026

(54) LENS WITH ADJUSTABLE LIGHT ANGLE AND LAMP

(71) Applicant: Xiamen Guangpu Electronics, Ltd., Xiamen (CN)

(72) Inventors: Jian Yang, Xiamen (CN); Qingqing Chen, Xiamen (CN); Guobiao Lin, Xiamen (CN)

(73) Assignee: Xiamen Guangpu Electronics, Ltd., Xiamen (CN)

( * ) Notice: Subject to any disclaimer, the term of this patent is extended or adjusted under 35 U.S.C. 154(b) by 0 days.

(21) Appl. No.: 19/081,945

(22) Filed: Mar. 17, 2025

(30) Foreign Application Priority Data

Aug. 27, 2024 (CN) ........................ 202411180417.0

(51) Int. Cl.

| | |
|---|---|
| ***F21V 14/06*** | (2006.01) |
| ***F21S 4/28*** | (2016.01) |
| ***F21V 5/04*** | (2006.01) |
| ***F21V 17/02*** | (2006.01) |
| *F21Y 105/12* | (2016.01) |

(52) U.S. Cl.
CPC ................ *F21V 14/06* (2013.01); *F21S 4/28* (2016.01); *F21V 5/04* (2013.01); *F21V 17/02* (2013.01); *F21Y 2105/12* (2016.08)

(58) Field of Classification Search
CPC .. F21V 14/06; F21V 5/04; F21V 17/02; F21S 4/28; F21Y 2105/12
See application file for complete search history.

(56) References Cited

U.S. PATENT DOCUMENTS

| | | | | |
|---|---|---|---|---|
| 6,390,643 B1 * | 5/2002 | Knight | .................... | F21V 19/02 362/249.11 |
| 11,353,195 B2 * | 6/2022 | Lang | ....................... | F21V 17/02 |
| 2008/0273324 A1 * | 11/2008 | Becker | .................... | F21V 14/06 362/237 |

FOREIGN PATENT DOCUMENTS

| | | | | |
|---|---|---|---|---|
| CN | 118654244 A * | 9/2024 | ................ | F21V 9/40 |
| CN | 118980070 A * | 11/2024 | .............. | F21S 10/00 |
| WO | WO-2023045050 A1 * | 3/2023 | .............. | F21V 29/89 |

OTHER PUBLICATIONS

Li, Lens Capable of Freely Adjusting Light Concentration Angle, 2023, WO2023045050A1, https://worldwide.espacenet.com/patent/search/family/085653202/publication/WO2023045050A1?q=pn%3DWO2023045050A1 (Year: 2023).*

* cited by examiner

*Primary Examiner* — Tracie Y Green
*Assistant Examiner* — Michael Chiang
(74) *Attorney, Agent, or Firm* — Cooper Legal Group, LLC

(57) ABSTRACT

A lens with adjustable light angle includes a lens outer portion, a spiral lens portion, and a lens middle cover portion. The spiral lens portion includes a spiral lens strip matched with a spiral lamp bead strip on the light source board. The spiral lens strip includes a light entering surface having a receiving groove corresponding to the spiral lamp bead strip and a light exiting surface. The light exiting surface is divided into a first light exiting surface and a second light exiting surface respectively extending from a middle of an arc-shaped surface to two sides of the arc-shaped surface. The lens middle cover portion is rotated to enable the receiving groove to move relative to the plurality of lamp beads, which allows light to be alternatively emitted (Continued)

from at least one of the first light exiting surface or the second light exiting surface.

14 Claims, 21 Drawing Sheets

LENS WITH ADJUSTABLE LIGHT ANGLE AND LAMP

RELATED APPLICATIONS

This application claims priority to Chinese patent application number 202411180417.0, filed on Aug. 27, 2024. Chinese patent application number 202411180417.0 is incorporated herein by reference.

FIELD OF THE DISCLOSURE

The present disclosure relates to the technical field of industrial and mining lamps and in particular to a lens with an adjustable light angle and a lamp.

BACKGROUND OF THE DISCLOSURE

Industrial and mining lamps, as essential tools for industrial lighting, are widely used in mining locations such as coal and metal mines, as well as in industrial environments such as factories and workshops, and in marine environments like docks and ships. These locations have specific requirements for lighting equipment, including high brightness, high efficiency, waterproofing, and corrosion resistance. The design of industrial and mining lamps typically focuses on providing a stable light source to ensure operational safety and efficiency.

However, traditional industrial and mining lamps have fixed light angles, making them incapable of being adjusted to suit different operational environments and lighting needs. Furthermore, single-lens designs limit the adaptability of these lamps, making them less effective in addressing the dynamic demands of industrial and marine environments. Traditional lamps also lack adjustment mechanisms, which may prevent them from achieving optimal lighting effects in specific scenarios.

BRIEF SUMMARY OF THE DISCLOSURE

The technical problem to be solved by the present disclosure is to provide a lens with an adjustable light angle and a lamp. The lens is designed to allow rotational adjustment, enabling the light angle to be modified as needed. This improves the adaptability and flexibility of the lighting, making it suitable for various applications.

In order to solve the above technical problems, the present disclosure provides a lens with adjustable light angle. The lens is configured to be matched with a light source board, and the lens comprises a lens outer portion, a spiral lens portion, and a lens middle cover portion. The spiral lens portion comprises a spiral lens strip, and the light source board comprises a spiral lamp bead strip. The spiral lamp bead strip is configured to be matched with the spiral lens strip.

The spiral lens strip comprises a light entering surface and a light exiting surface. The light entering surface faces the spiral lamp bead strip, and the light entering surface comprises a receiving groove corresponding to a plurality of lamp beads of the spiral lamp bead strip.

The light exiting surface is an arc-shaped surface. The light exiting surface is respectively divided into a first light exiting surface and a second light exiting surface respectively extending from a middle of the arc-shaped surface to two sides of the arc-shaped surface, and a curvature value of the first light exiting surface is different from a curvature value of the second light exiting surface.

The spiral lens portion is connected to the lens middle cover portion, and the lens middle cover portion is configured to be rotated to drive the spiral lens portion to drive the spiral lens strip to be rotated synchronously, so that the spiral lens strip is rotated relative to the spiral lamp bead strip to enable the receiving groove to move relative to the plurality of lamp beads. A position change of the plurality of lamp beads in the receiving groove allows light emitted by the plurality of lamp beads to be alternatively emitted from at least one of the first light exiting surface or the second light exiting surface.

In a preferred embodiment, a rotation of the spiral lens strip in a plane creates an illusion of a dynamic spiral movement, and a rotation angle range of the spiral lens portion is −60° to 60°. The spiral lens strip is configured to be rotated counterclockwise to correspond to a rotation angle of −60°, and the spiral lens strip is configured to be rotated clockwise to correspond to a rotation angle of 60°.

In a preferred embodiment, the lens middle cover portion comprises a first rotation position, a second rotation position, and a third rotation position, and the second rotation position is a middle gear position.

When the lens middle cover portion is rotated clockwise to correspond to the first rotation position, an inner wall of the receiving groove moves inward along a radial direction of the lens middle cover portion relative to the plurality of lamp beads. When the lens middle cover portion is rotated counterclockwise to correspond to the third rotation position, the inner wall of the receiving groove moves outward along the radial direction of the lens middle cover portion relative to the plurality of lamp beads.

In a preferred embodiment, the lens middle cover portion comprises gear position marks corresponding to the first rotation position, the second rotation position, and the third rotation position, and the lens middle cover portion comprises rotation direction marks.

In a preferred embodiment, when the lens middle cover portion is in the second rotation position, the plurality of lamp beads are located on or adjacent to a middle position of the receiving groove.

When the lens middle cover portion is in the first rotation position, the plurality of lamp beads are located below the first light exiting surface.

When the lens middle cover portion is in the third rotation position, the plurality of lamp beads are located below the second light exiting surface.

In a preferred embodiment, arc-shaped protrusions corresponding to the first rotation position, the second rotation position, and the third rotation position are respectively provided on an outer edge of the spiral lens portion, and arc-shaped positioning grooves are provided along an edge of the light source board.

When the lens is rotated, the arc-shaped protrusions respectively form a snap fit with the arc-shaped positioning grooves.

In a preferred embodiment, the light entering surface and the light exiting surface are different surfaces, and a curvature value of the light entering surface is smaller than a curvature value of the light exiting surface.

In a preferred embodiment, the light entering surface is a first arc-shaped surface.

The light entering surface is respectively divided into a first light entering surface and a second light entering surface respectively extending from a middle of the first arc-shaped surface to two sides of the first arc-shaped surface. The first light entering surface and the second light entering surface have different curvature values.

In a preferred embodiment, the light entering surface is a flat surface.

In a preferred embodiment, the receiving groove extending along a spiral path, and the receiving groove has an activity space for the plurality of lamp beads.

In a preferred embodiment, a minimum distance between a top surface of the receiving groove and light emitting surfaces of the plurality of lamp beads is greater than or equal to 0.2 mm.

In a preferred embodiment, a recessed depth of the first light entering surface is less than or equal to one-third of a width of the receiving groove, and a protruding height of the first light exiting surface and the second light exiting surface is greater than or equal to 3 times the recessed depth of the first light entering surface. A width of the first light exiting surface and the second light exiting surface is greater than or equal to half of a pitch of the spiral lens strip.

In a preferred embodiment, a sum of half a width of each of the plurality of lamp beads and an offset distance of the plurality of lamp beads when the lens is rotated clockwise by 60° is less than the width of the receiving groove. A sum of half the width of each of the plurality of lamp beads and the offset distance of the plurality of lamp beads when the lens is rotated counterclockwise by 60° is less than the width of the receiving groove.

The present disclosure further provides a lamp, and the lamp comprises a lamp body, the light source board, and the lens with the adjustable light angle. The spiral lens portion is installed to correspond to the spiral lamp bead strip, and the lens is fixedly connected to the lamp body through the lens outer portion.

Compared with the existing techniques, the technical solution has the following advantages.

1. Through a design of the spiral lens strip and the rotation of the spiral lens strip, a position change of the spiral lens strip relative to the lamp can be adjusted. The position change enables the plurality of lamp beads to be aligned with different position of the light exiting surface with different curvature values, generating various beam angles to meet the lighting requirements of different scenarios.
2. Through the spiral lens portion, the relative position between the lens and the plurality of lamp beads can be precisely adjusted, enabling flexible control of the light emitting angle. The rotation of the spiral lens portion is synchronized with changes in the overall light angle of the lamp, providing stepless adjustment capability. The user can achieve any desired light angle to accommodate various lighting scenarios and requirements.
3. Through the lens middle cover portion, the rotational mechanism becomes simple, intuitive, and easy to operate. The user can quickly familiarize themselves with the process without needing complex adjustments. The rotational mechanism is designed to be smooth and aesthetically pleasing, enhancing the overall appearance of the lamp.

Figure 1:
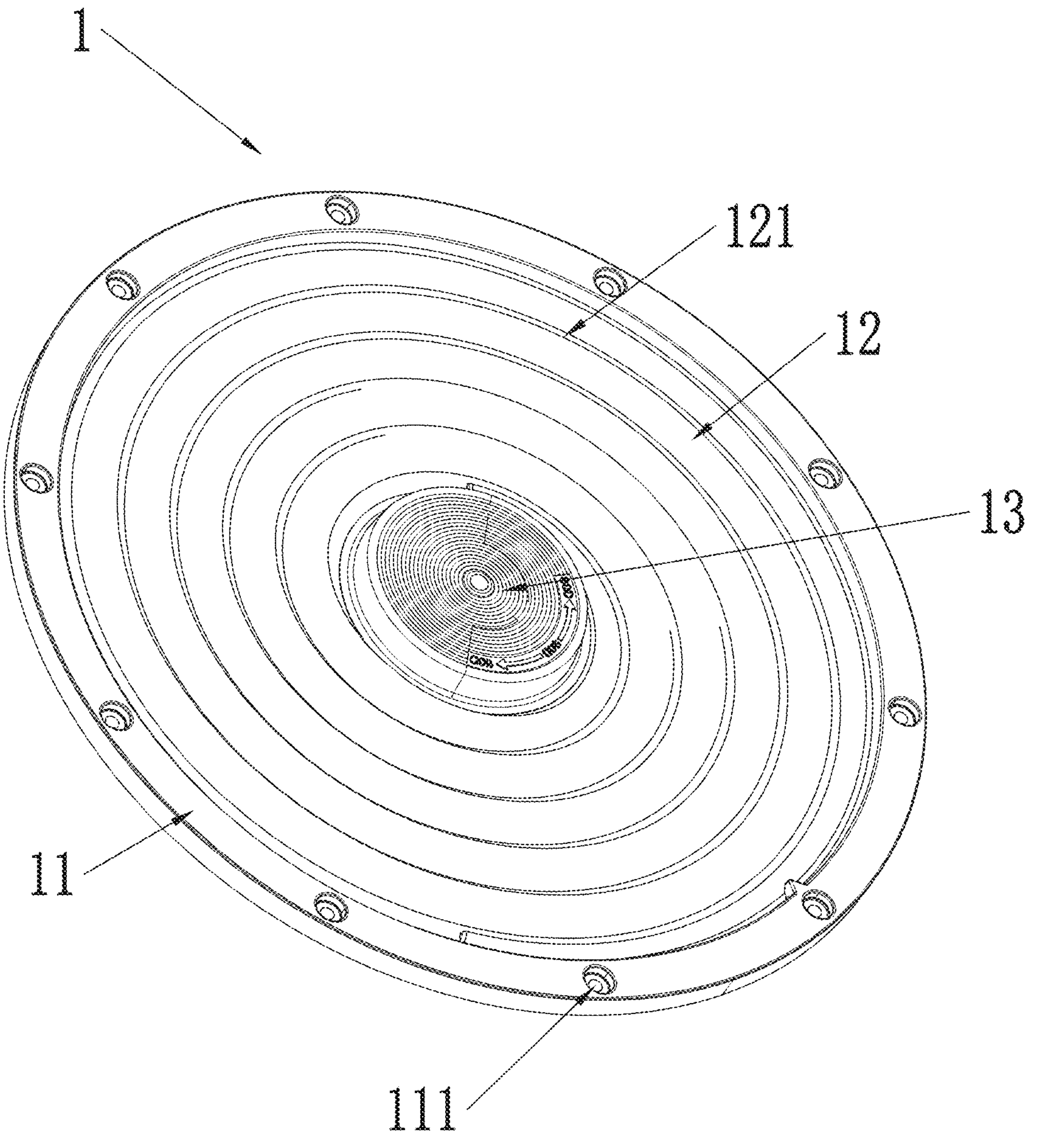
FIG. 1 is a front schematic view of a lens in a preferred embodiment of the present disclosure.

Reference Numerals in Figures: 1. lens; 11. lens outer portion; 111. screw hole; 112. arc-shaped protrusion; 12. spiral lens portion; 121. spiral lens strip; 122. first light entering surface; 123. second light entering surface; 124. first light exiting surface; 125. receiving groove; 126. second light exiting surface; 127. connecting imaginary line connecting an inner wall and an outer wall of the receiving groove; 128. outer wall of the receiving groove; 129. inner wall of the receiving groove; 13. lens middle cover portion; 131. gear position mark; 132. rotation direction mark; 2.

light source board; 21. PCB; 211. arc-shaped positioning groove; 22. Spiral lamp bead strip; 23. lamp bead; 3. lamp.

DETAILED DESCRIPTION OF THE EMBODIMENTS

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms "upper", "lower", "inner", "outer", "top end", "bottom end", etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a wall hanging connection, a detachable connection, or an integral connection, a mechanical connection, an electrical connection, a direct connection, or an indirect connection through an intermediate medium, and it can be a connection in two members. For those of ordinary skill in the art, the specific meaning of the above terms in the present disclosure can be understood under specific conditions.

Figure 18:
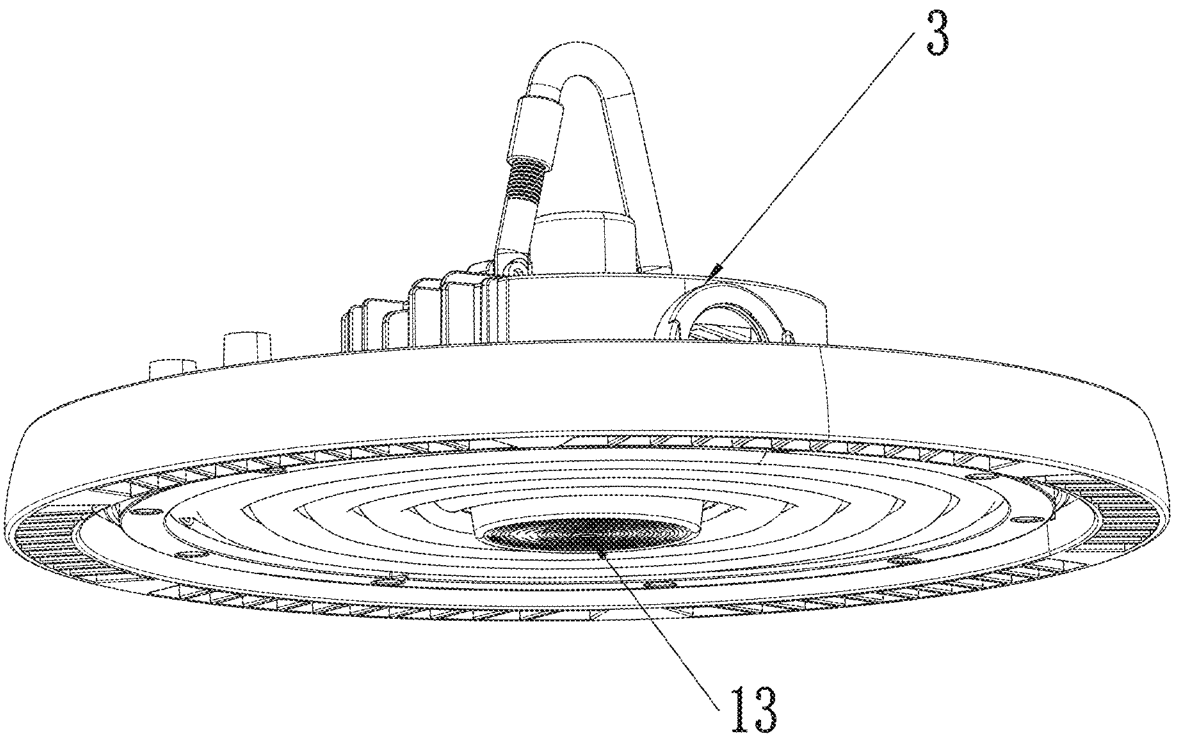
FIG. 18 is a structural diagram of the lamp in the preferred embodiment of the present disclosure.

Referring to FIGS. 1 to 18, the present embodiment provides a lens with an adjustable light angle. The lens 1 is configured to be matched with a light source board 2, and the lens 1 is disposed on a lamp 3. An overall structure of the lamp 3 is shown in FIG. 18.

Referring to FIG. 1, the lens 1 comprises a lens outer portion 11, a spiral lens portion 12, and a lens middle cover portion 13. The lens outer portion 11 is configured to be fixedly connected to the lamp 3. The lens outer portion 11 comprises a plurality of screw holes 111 arranged along a circumferential direction of the lens outer portion 11. The plurality of screw holes 111 have a function of securing the lens outer portion 11. The spiral lens portion 12 is connected to the lens middle cover portion 13, and a rotation of the lens middle cover portion 13 is configured to drive the spiral lens portion 12 to rotate relative to the lens outer portion 11. A rotation of the spiral lens portion 12 in a plane creates an illusion of a dynamic spiral movement.

Figure 4:
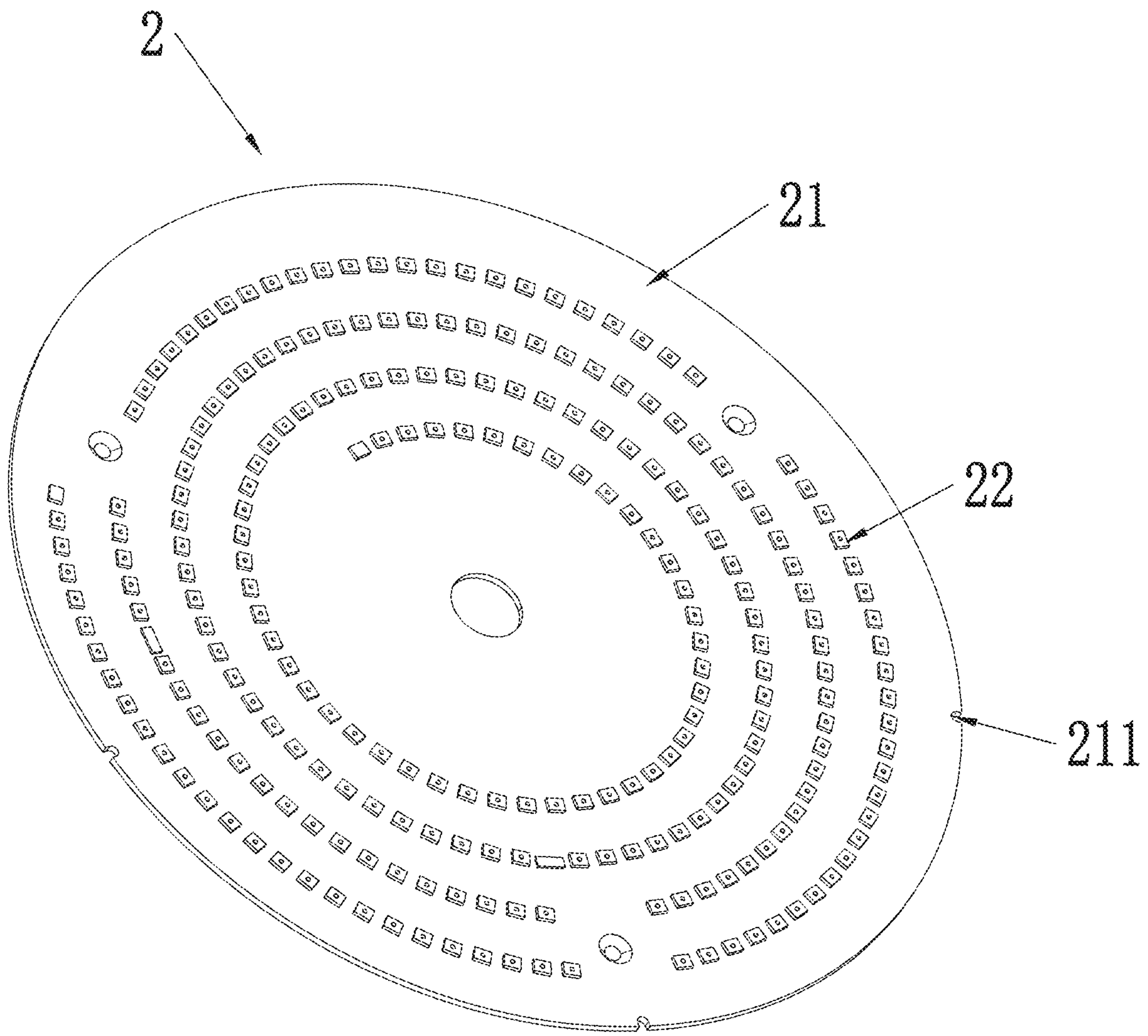
FIG. 4 is a structural diagram of a light source board in the preferred embodiment of the present disclosure.

The light source board 2 is installed in the lamp 3, and the lens 1 covers a light emitting surface of the light source board 2 to adjust a light emitting angle of a plurality of lamp beads 23. The light source board 2 comprises a Printed Circuit Board (PCB) 21 and the plurality of lamp beads 23 (i.e., the plurality of lamp beads 23 are 2835 lamp beads 23). The PCB 21 is disposed with the plurality of lamp beads 23 arranged in a regular pattern. As shown in FIG. 4, and the plurality of lamp beads 23 are arranged in a spiral pattern to form a spiral lamp bead strip 22.

The spiral lens portion 12 comprises a spiral lens strip 121, a number of spiral turns of the spiral lens strip 121 is set to approximately 4 turns, a number of spiral turns of the spiral lamp bead strip 22 is set to approximately 4 turns, and the spiral lens strip 121 corresponds to the spiral lamp bead strip 22. Driven by the lens middle cover portion 13, a relative position of the spiral lens strip 121 and the spiral lamp bead strip 22 will be displaced and changed, and light emitted by the plurality of lamp beads 23 will enter the spiral lens strip 121 from different positions of the spiral lens strip 121 due to the relative position of the spiral lens strip 121 and the spiral lamp bead strip 22 being displaced and changed. Under a condition that the light emitted by the plurality of lamp beads 23 remains unchanged, a structure of the lens 1 remains unchanged, and an interval between the lens 1 and the plurality of lamp beads 23 remains unchanged, a light emitting angle of the light is adjusted by changing a position where the lens 1 receives the light and a curvature value of a surface from which the light is emitted.

In terms of specific structural design, the spiral lens strip 121 comprises a light entering surface and a light exiting surface. The light entering surface is a first arc-shaped surface, which is slightly concave and asymmetrical. The first arc-shaped surface of the light entering surface is respectively divided into a first light entering surface 122 and a second light entering surface 123 respectively extending from a middle of the first arc-shaped surface to two sides of the first arc-shaped surface. The first light entering surface 122 and the second light entering surface 123 have different curvature values. A curvature value of the first light entering surface 122 is slightly smaller than a curvature value of the second light entering surface 123. The light exiting surface is a second arc-shaped surface, which is asymmetric, and an overall curvature change of the light exiting surface is relatively large relative to the light entering surface. The light exiting surface is respectively divided into a first light exiting surface 124 and a second light exiting surface 126 respectively extending from a middle of the second arc-shaped surface to two sides of the second arc-shaped surface. A curvature value of the first light exiting surface 124 is smaller than a curvature value of the second light exiting surface 126.

In this embodiment, in order to avoid interference between the spiral lens strip 121 and the plurality of lamp beads 23 when the spiral lens strip 121 is displaced, the light entering surface is in a slightly recessed state. Even if the first light entering surface 122 and the second light entering surface 123 are surfaces with zero curvature (i.e., the first light entering surface 122 and the second light entering surface 123 are planes), a plane formed by a connecting imaginary line 127 of an inner wall and an outer wall of a receiving groove 125 should maintain a certain gap with light emitting surfaces of the plurality of lamp beads 23. The first light entering surface 122 is connected to the outer wall 128 of the receiving groove 125, and the second light entering surface 123 is connected to the inner wall 129 of the receiving groove 125.

When the spiral lens strip 121 rotates, a position of the spiral lens strip 121 relative to a position of the spiral lamp bead strip 22 is changed, and the plurality of lamp beads 23 can choose to emit the light from at least one of the first light exiting surface 124 or the second light exiting surface 126 as the rotation of the lens 1 is adjusted. Since the curvature value of the first light exiting surface 124 and the curvature value of the second light exiting surface 126 are different, different light emitting angles will be generated, thereby generating different beam angles.

Figure 2:
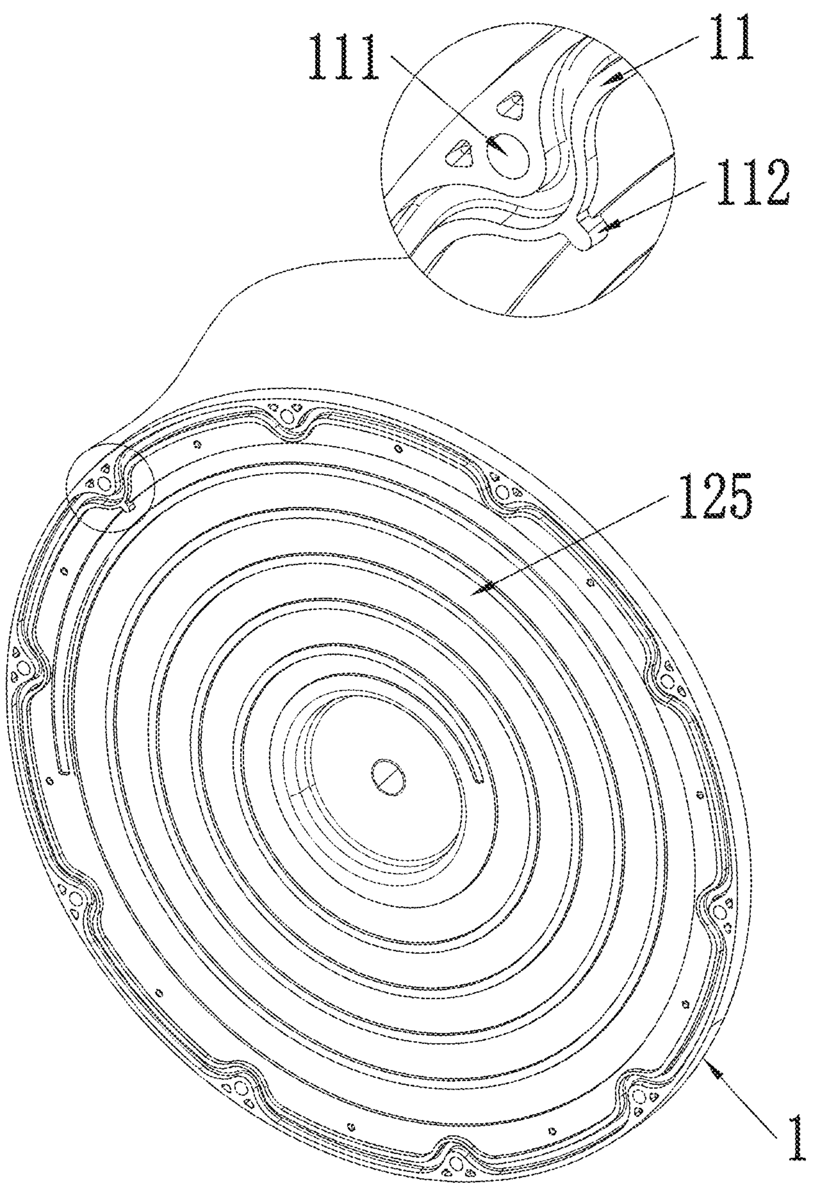
FIG. 2 is a rear schematic view of the lens in the preferred embodiment of the present disclosure.

Referring to FIG. 2, the spiral lens strip 121 and the spiral lamp bead strip 22 are matched with each other. A structure of the spiral lens strip 121 corresponding to the plurality of the lamp beads comprises the receiving groove 125, and the receiving groove 125 is connected to the first light entering surface 122 and the second light entering surface 123. The receiving groove 125 is used to cover the plurality of lamp beads 23. The receiving groove 125 is arranged below the spiral lens strip 121, and the receiving groove 125 extends along a spiral path to cover the spiral lamp bead strip 22 along the spiral path. At the same time, to cooperate with the rotation of the spiral lens portion 12 and provide a sufficient activity space for the plurality of lamp beads 23, the receiving groove 125 defines a certain activity space for the plurality of lamp beads 23.

Figure 6:
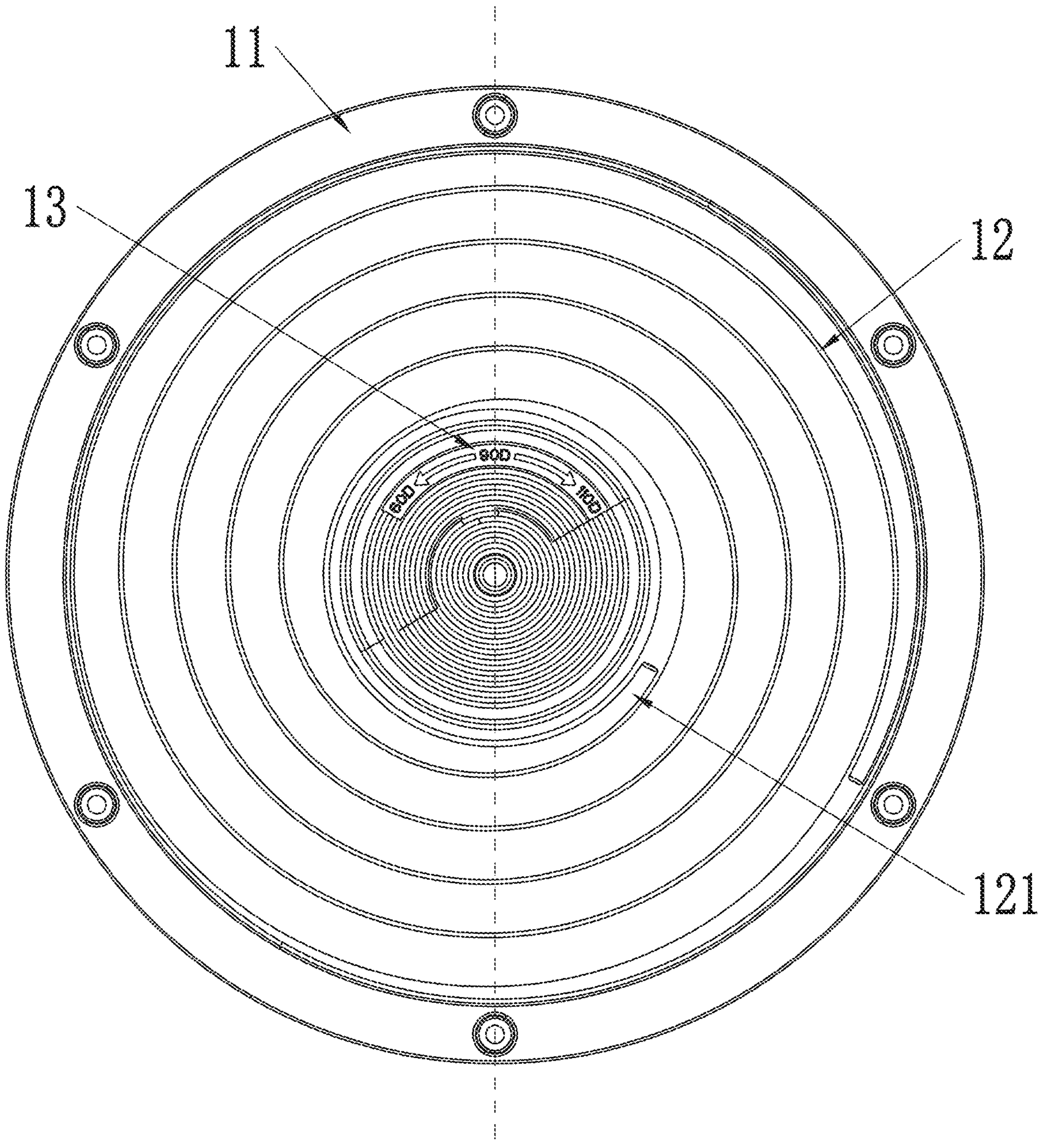
FIG. 6 is a schematic view showing a position of the lens when a lamp is in a first matching position in the preferred embodiment of the present disclosure.
Figure 9:
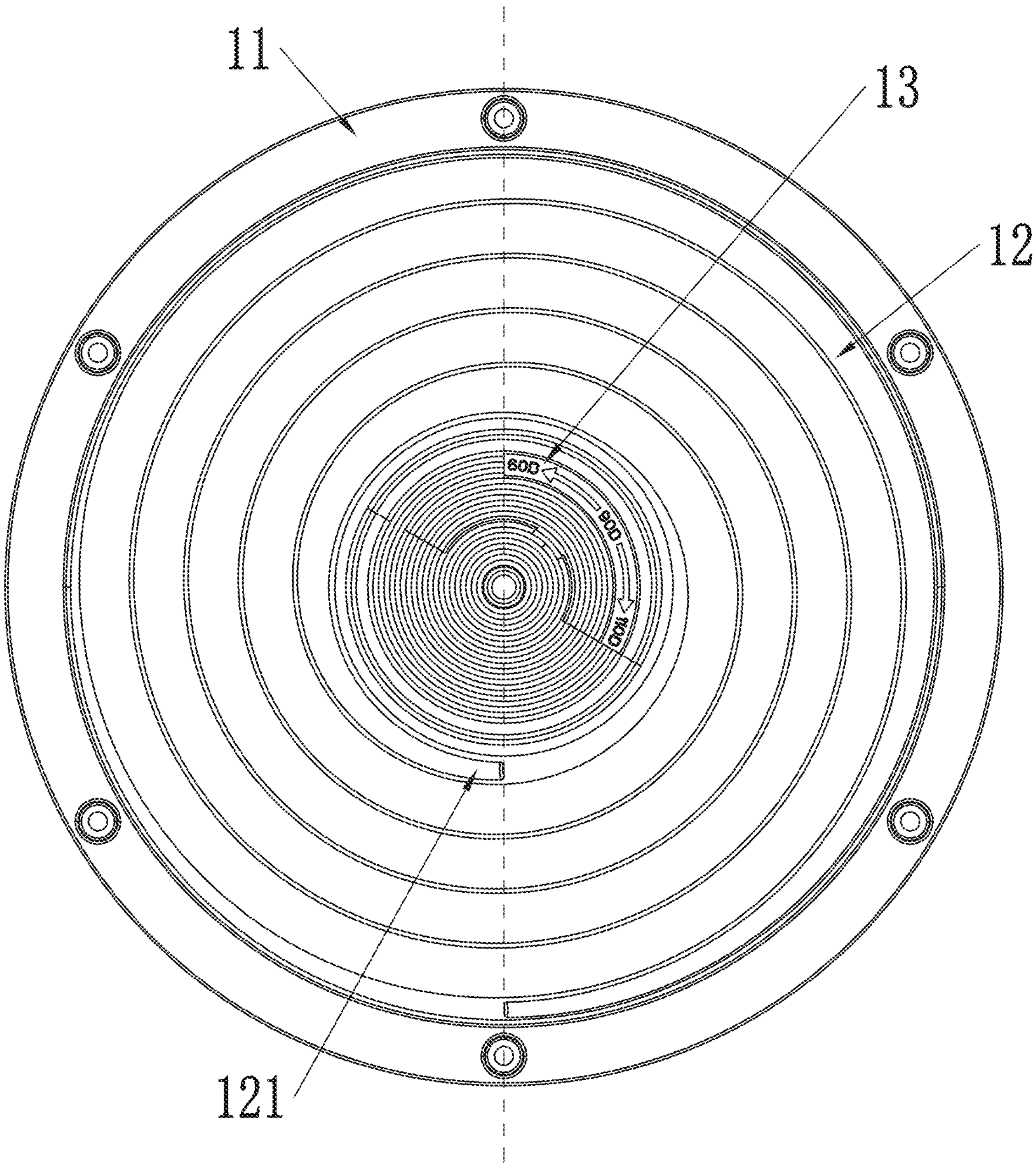
FIG. 9 is a schematic view showing the position of the lens when the lamp is in a second matching position in the preferred embodiment of the present disclosure.
Figure 12:
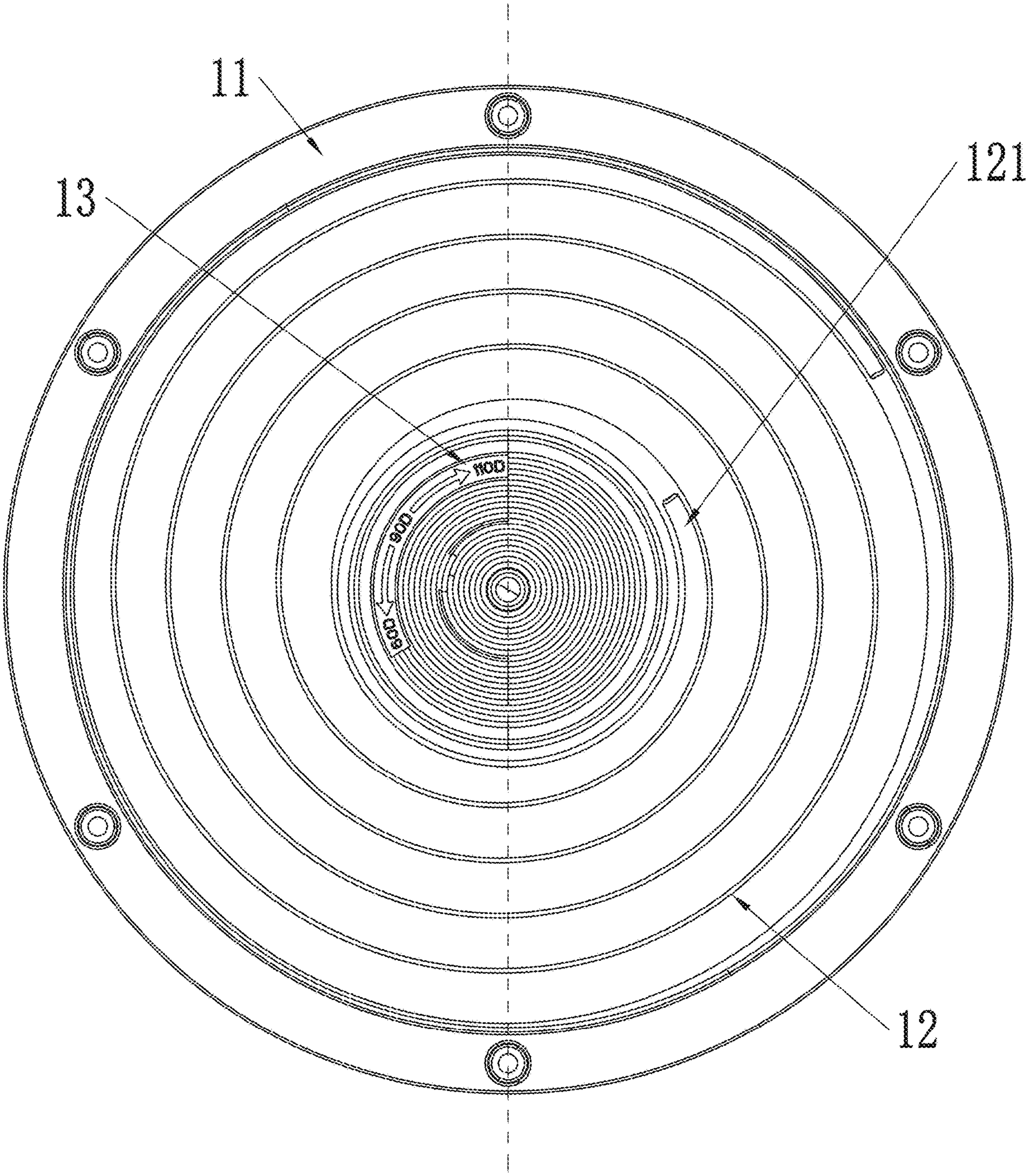
FIG. 12 is a schematic view showing the position of the lens when the lamp is in a third matching position in the preferred embodiment of the present disclosure.

During the rotation of the spiral lens portion 12 and displacement of the receiving groove 125, an interference problem between the receiving groove 125 and the plurality of lamp beads 23 can occurs. In this embodiment, a rotation angle of the spiral lens portion 12 is limited, and a rotation angle range of the spiral lens portion 12 is set at −60°-60°. Due to a limitation of the rotation angle range, three rotation positions are set on the lens middle cover portion 13. As shown in FIG. 9, a first rotation position corresponds to a rotation angle of 60°. The spiral lens portion 12 can be rotated clockwise from a second rotation position to the first rotation position, and the inner wall 129 of the receiving groove 125 moves inward along a radial direction of the lens middle cover portion 13 relative to the plurality of lamp beads 23. As shown in FIG. 6, the second rotation position corresponds to a rotation angle of 0°, and the second rotation position corresponds to an initial lighting angle of the lamp 3. As shown in FIG. 12, a third rotation position corresponds to a rotation angle of −60°. The spiral lens portion 12 can be rotated counterclockwise from the second rotation position to the third rotation position, and the inner wall 129 of the receiving groove 125 moves outward along the radial direction of the lens middle cover portion 13 relative to the plurality of lamp beads 23.

Figure 3:
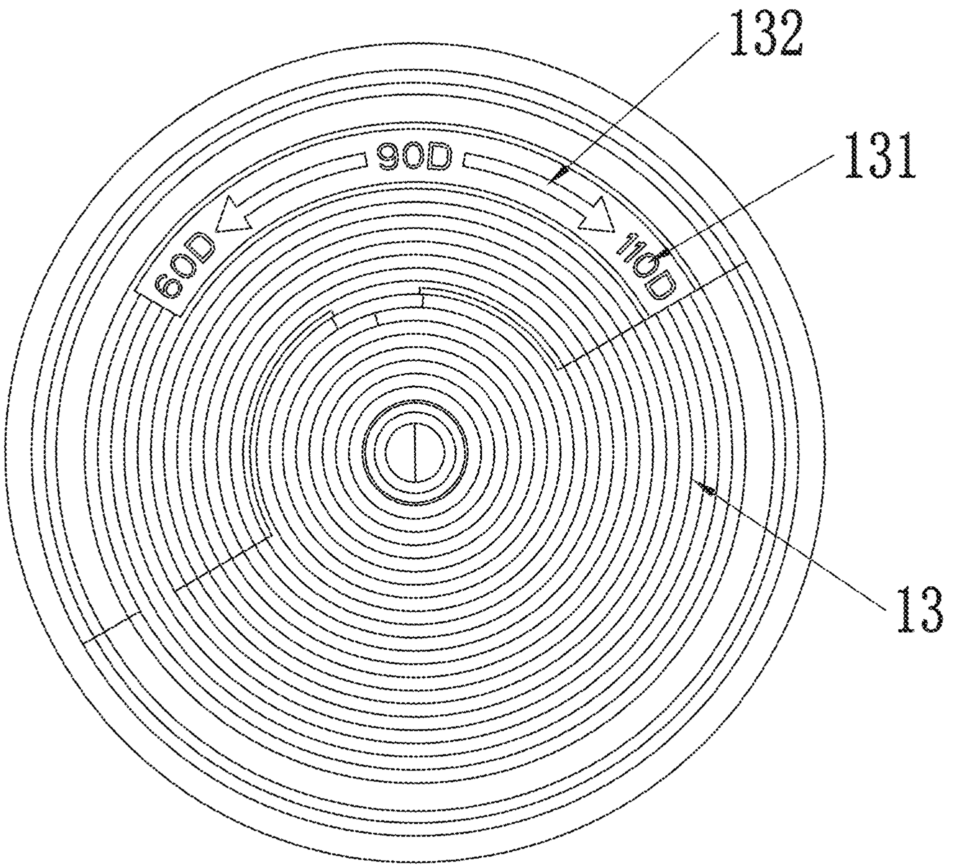
FIG. 3 is an enlarged view of a lens middle cover portion of the lens in the preferred embodiment of the present disclosure.

Referring to FIG. 3, to intuitively judge and perform a rotation operation, three gear position marks 131 and two rotation direction marks 132 are formed on an end surface of the lens middle cover portion 13. The three gear position marks 131 are divided into “90D”, “60D”, and “110D”. The first rotation position corresponds to 60D, the second rotation position corresponds to 90D, and the third rotation position corresponds to 110D. The two rotation direction marks 132 are arrows.

Figure 5:
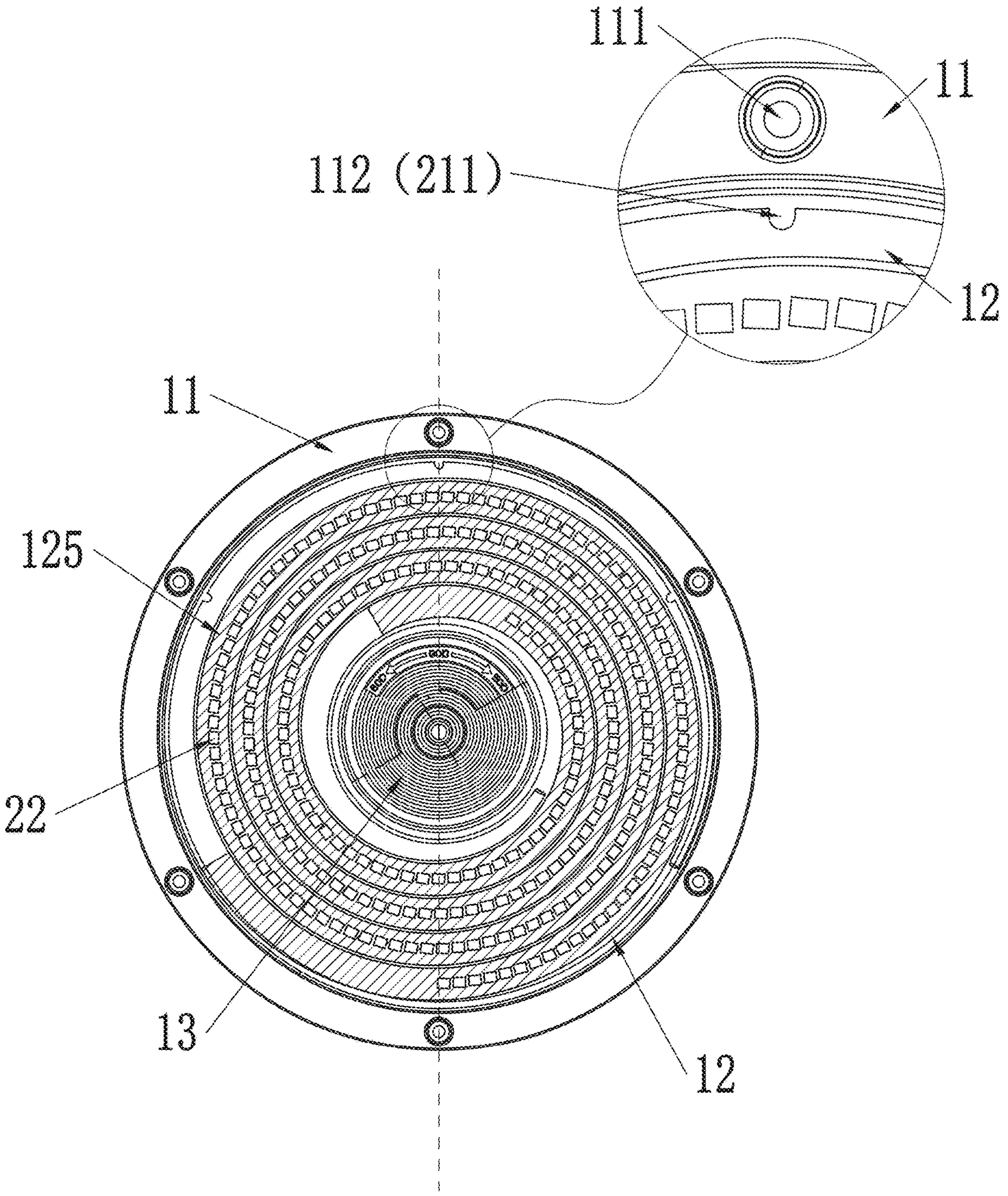
FIG. 5 is an assembly state of the light source board and lens in the preferred embodiment of the present disclosure.

When installing the lens 1 and a lamp body of the lamp 3, in order for positioning, the light source board 2 comprises a positioning line. In order to facilitate the subsequent description of a relative position of the light source board 2 and the lens 1, as shown in FIG. 5, a dotted line in FIG. 5 is the positioning line. When assembled with the light source board 2, a lower side of the spiral lens portion 12 corresponds to the spiral lamp bead strip 22 of the light source board 2. As shown in FIG. 6, when the mark “90D” is aligned with the positioning line of the light source board 2, the plurality of lamp beads 23 are located on or adjacent to a middle position of the receiving groove 125. The middle position corresponds to the middle of the light exiting surface. At this time, the initial lighting angle of the lamp 3 is provided. FIG. 5 shows a matching state of the light source board 2 and the lens 1 at this time.

In order to ensure that the lens 1 can be accurately rotated, three arc-shaped protrusions 112 corresponding to the marks “90D”, “60D”, and “110D” are respectively provided on an outer edge of the spiral lens portion 12, and three arc-shaped positioning grooves 211 are provided along an edge of the light source board 2. When the lens 1 is rotated, the three arc-shaped protrusions 112 can respectively form a snap fit with the three arc-shaped positioning grooves 211 of the light source board 2, and an obvious stop is generated when the lens 1 is rotated, which is convenient for the user to identify that the lens 1 has been rotated to a required angle position.

When the lens 1 is rotated on the lamp 3, the relative position of the spiral lens strip 121 and the spiral lamp bead strip 22 are adjusted as follows.

Figure 7:
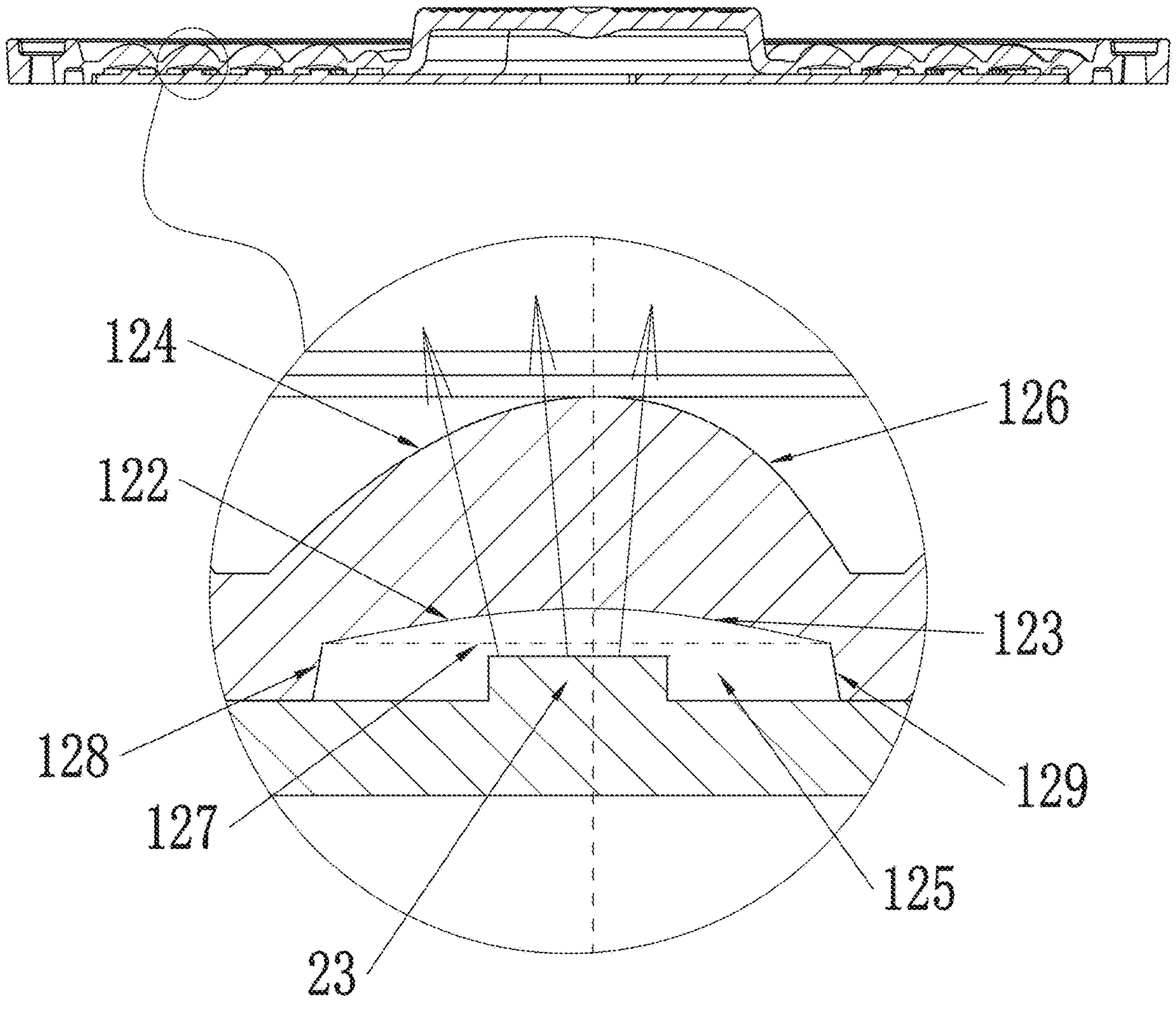
FIG. 7 is a schematic view showing a position of a lamp bead when the lamp is in the first matching position in the preferred embodiment of the present disclosure.

A first matching position is shown in FIG. 6. When the mark “90D” of the three gear position marks 131 on the lens 1 is aligned with the positioning line of the light source board 2, a rotation angle of the lens 1 is 0°, and the spiral lamp bead strip 22 corresponds to a middle of the spiral lens strip 121. As shown in FIG. 7, the plurality of lamp beads 23 correspond to the middle of the second arc-shaped surface of the light exiting surface, and the plurality of lamp beads 23 are located at an intersection of a normal line of the first light exiting surface 124 and a normal line of the second light exiting surface 126. A vertical dotted line in FIG. 7 is a normal line of the lens 1. At this time, the light emitted by the plurality of lamp beads 23 is emitted from the first light exiting surface 124 and the second light exiting surface 126 at the same time, forming a light beam with a mixed beam angle.

Figure 8:
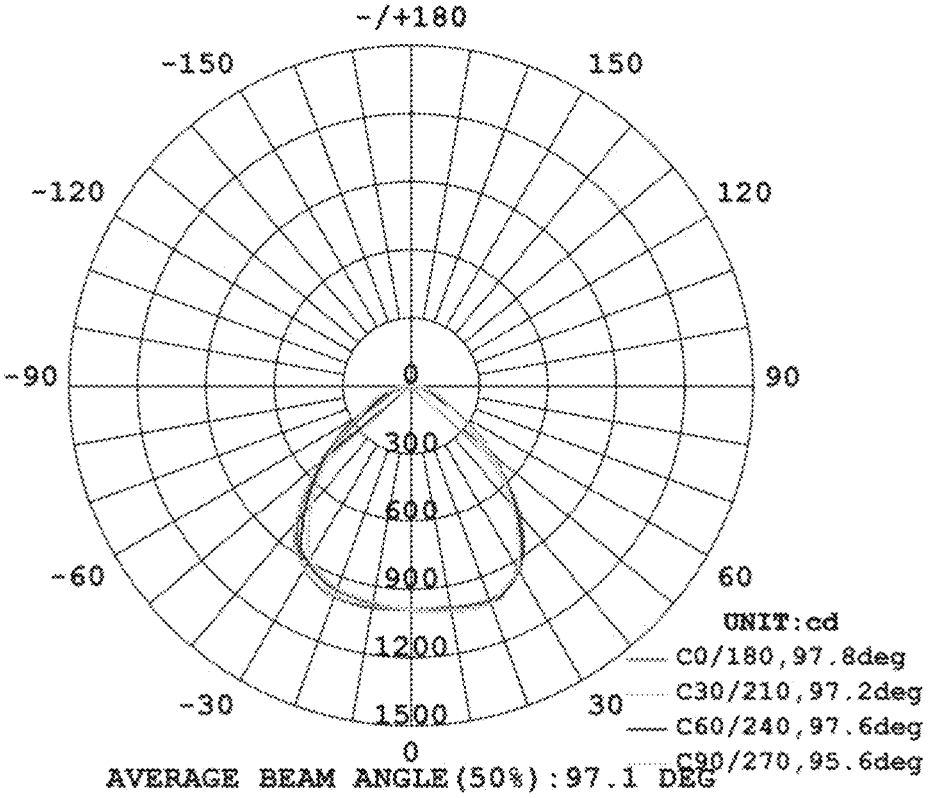
FIG. 8 is a measured light distribution curve when the lamp is in a first matching position in the preferred embodiment of the present disclosure.
Figure 19:
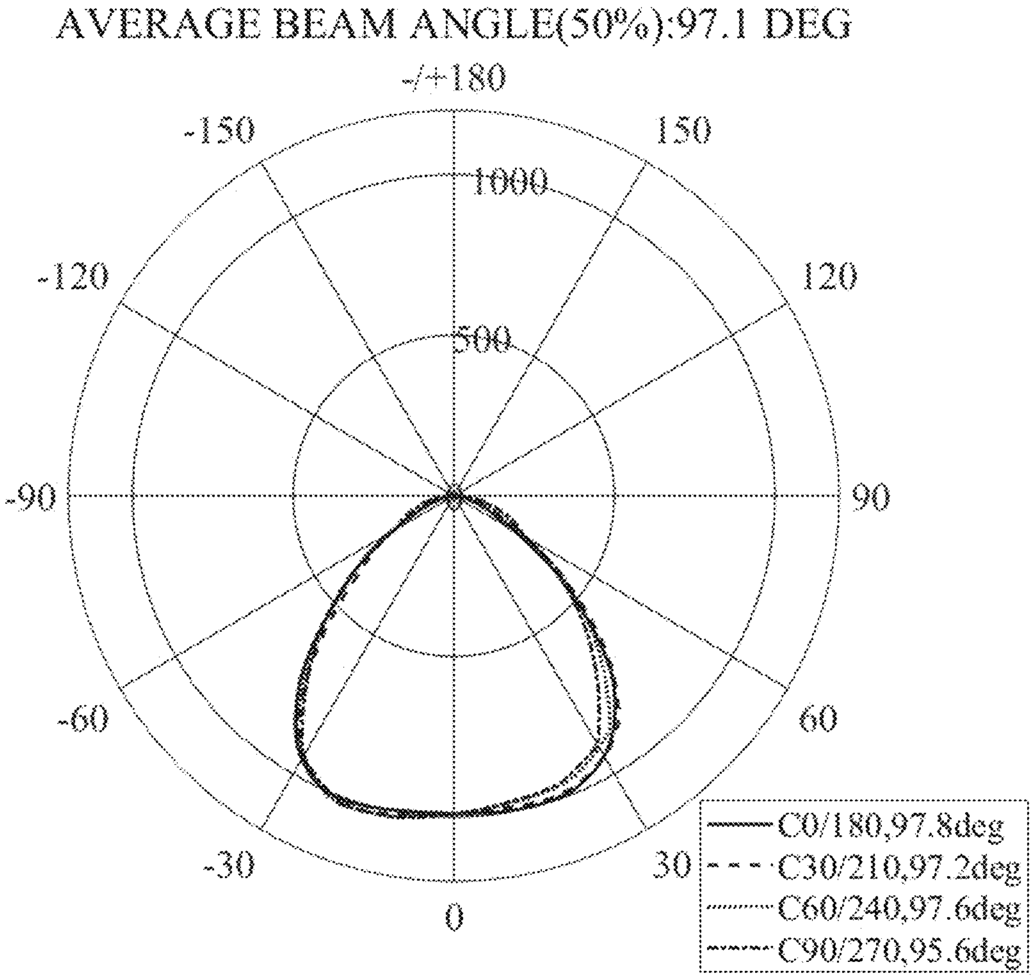
FIG. 19 is a measured light distribution curve when the lamp is in the first matching position in the preferred embodiment of the present disclosure, which aligns with the measured light distribution curve shown in FIG. 8.

When a matching angle between the light source board 2 and the lens 1 is 0° (i.e., the first matching position), the plurality of lamp beads 23 are adjacent to the vertical dotted line of the lens 1. Measured light distribution curves are shown in FIG. 8 and FIG. 19, and an average light output angle is 97.1°.

Figure 10:
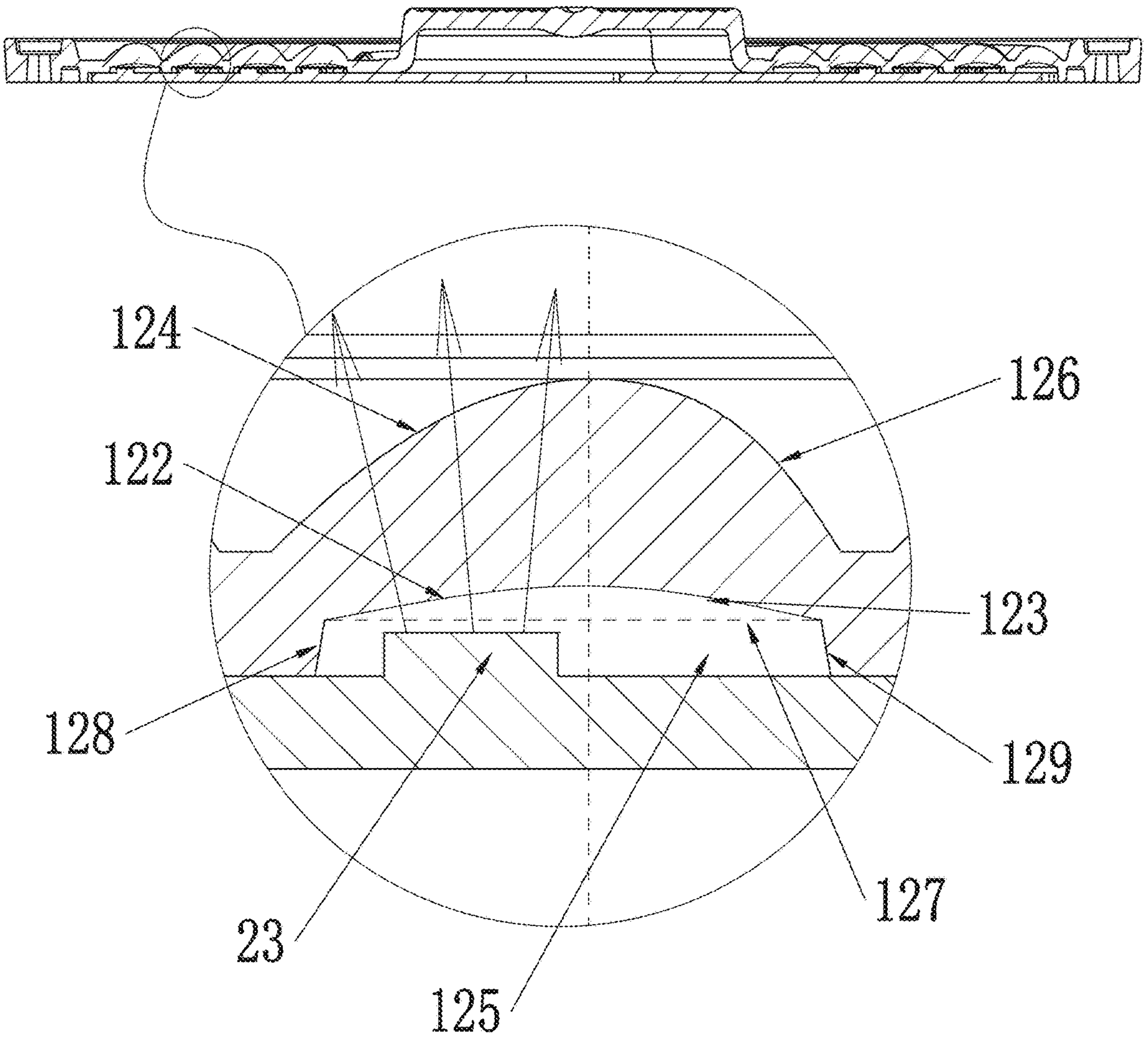
FIG. 10 is a schematic view showing the position of the lamp bead when the lamp is in the second matching position in the preferred embodiment of the present disclosure.

A second matching position is shown in FIG. 9. A position of the light source board 2 remains unchanged, and the lens 1 is rotated 60° clockwise, so that when the mark “60D” of the three gear position marks 131 on the lens 1 is close to the positioning line of the light source board 2, the inner wall 129 of the receiving groove 125 moves inward along the radial direction of the lens middle cover portion 13. As shown in FIG. 10, an outer side of the receiving groove 125 moves inward relative to the plurality of lamp beads 23. That is, the plurality of lamp beads 23 are adjacent to the outer wall 128 of the receiving groove 125. At this time, the plurality of lamp beads 23 are located below the first light entering surface 122 and the first light exiting surface 124. The light emitted by the plurality of lamp beads 23 mainly enters from the first light entering surface 122 and is emitted from the first light exiting surface 124, forming a light beam angle. The vertical dotted line in FIG. 10 is the normal line of the lens 1.

Figure 11:
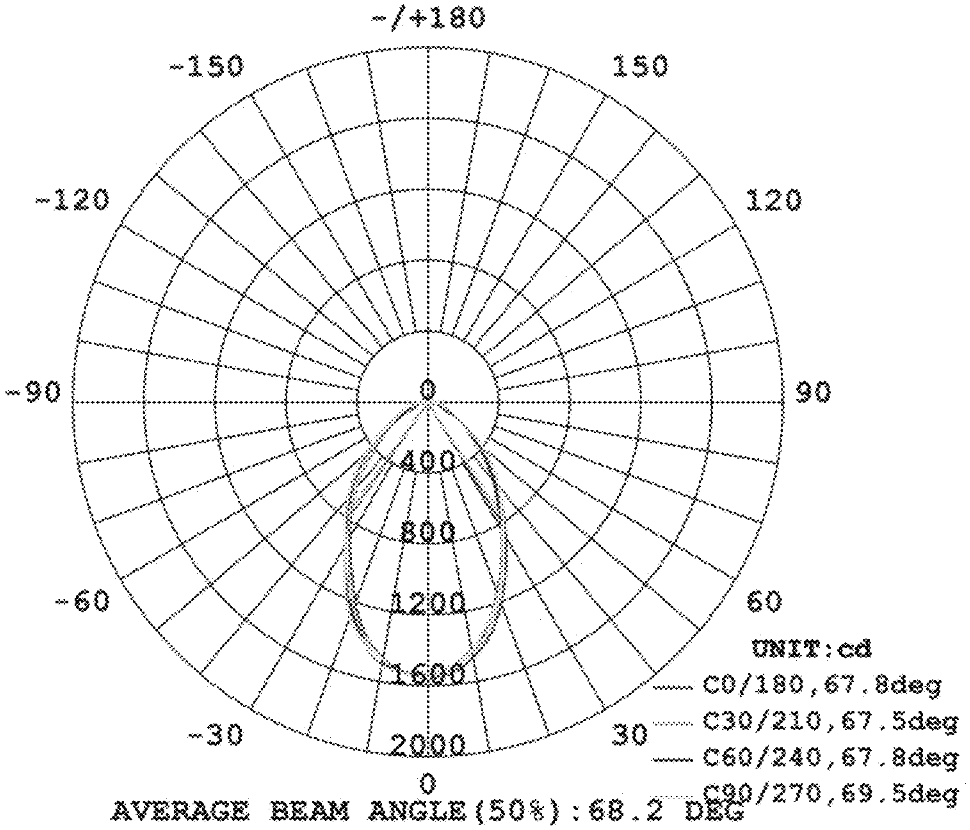
FIG. 11 is the measured light distribution curve when the lamp is in the second matching position in the preferred embodiment of the present disclosure.
Figure 20:
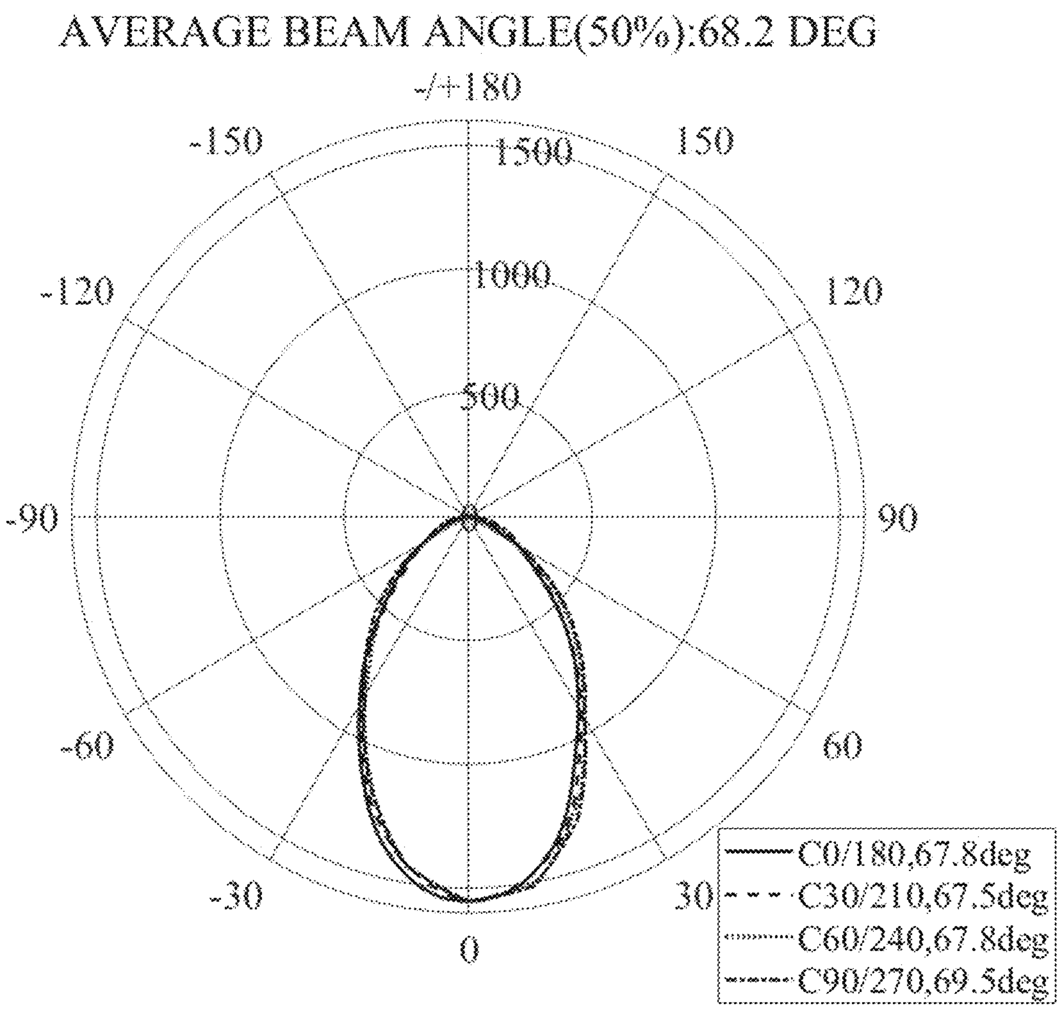
FIG. 20 is a measured light distribution curve when the lamp is in the second matching position in the preferred embodiment of the present disclosure, which aligns with the measured light distribution curve shown in FIG. 11.

When the matching angle between the light source board 2 and the lens 1 is 60° (i.e., the second matching position), the plurality of lamp beads 23 are located outside the middle of the second arc-shaped surface of lens 1. The measured light distribution curves are shown in FIG. 11 and FIG. 20, and the average light output angle is 68.2°.

Figure 13:
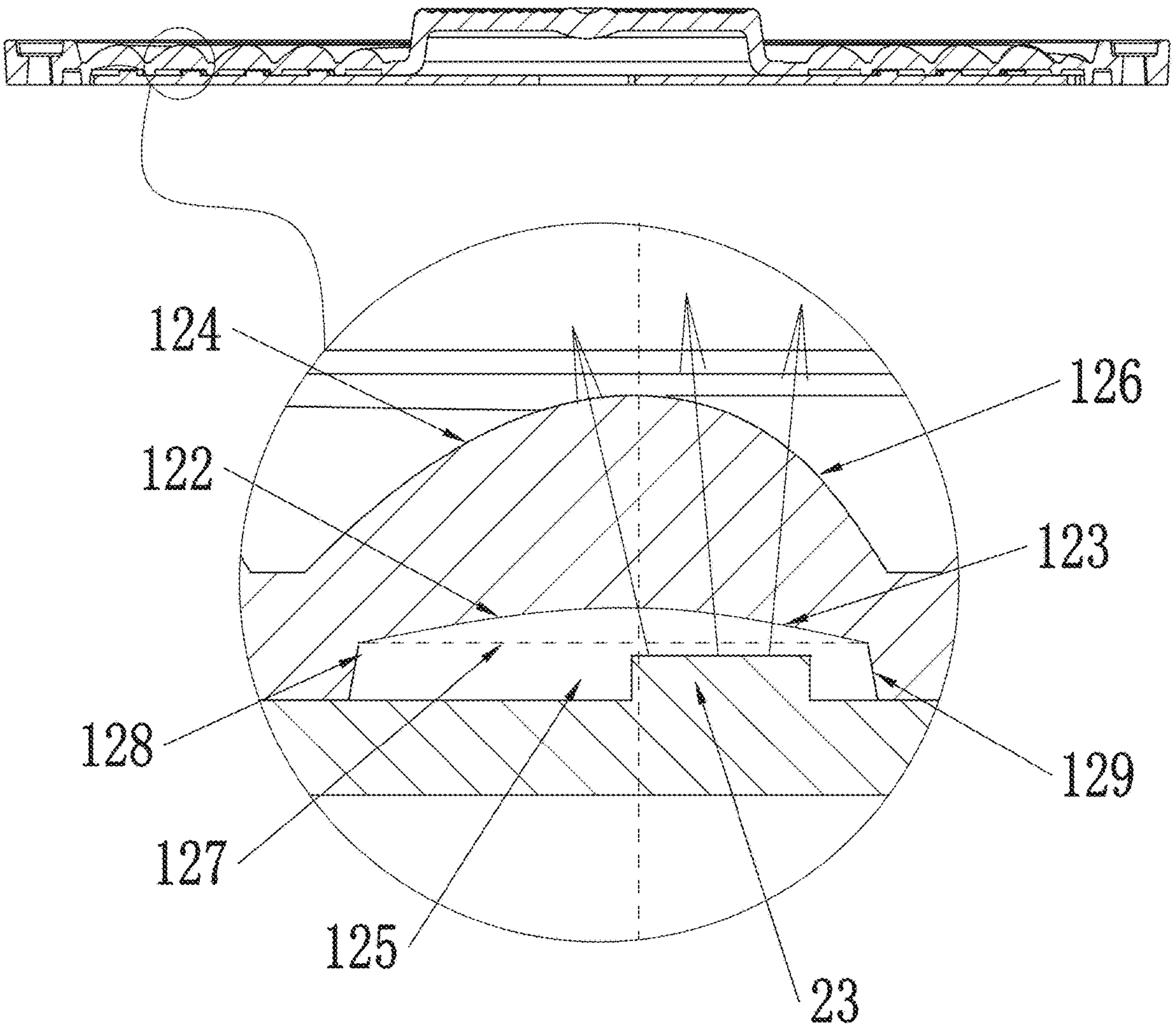
FIG. 13 is a schematic view showing the position of the lamp bead when the lamp is in the third matching position in the preferred embodiment of the present disclosure.

A third matching position is shown in FIG. 12. The position of the light source board 2 remains unchanged, and the lens 1 is rotated 60° counterclockwise (i.e., from the 0° to the −60°), so that the mark “110D” of the three gear position marks 131 on the lens 1 is close to the positioning line of the light source board 2, and the inner wall 129 of the receiving groove 125 moves outward along the radial direction of the lens middle cover portion 13. As shown in FIG. 13, the lamp bead 23 moves toward an inner side of the receiving groove 125. That is, the plurality of lamp beads 23 are adjacent to the inner wall 129 of the receiving groove 125. At this time, the plurality of lamp beads 23 are located below the second light entering surface 123 and the second light exiting surface 126. The light emitted by the plurality of lamp beads 23 mainly enters from the second light entering surface 123 and is emitted from the second light exiting surface 126, forming another light beam angle. The dotted line in FIG. 13 is the normal line the lens 1.

Figure 14:
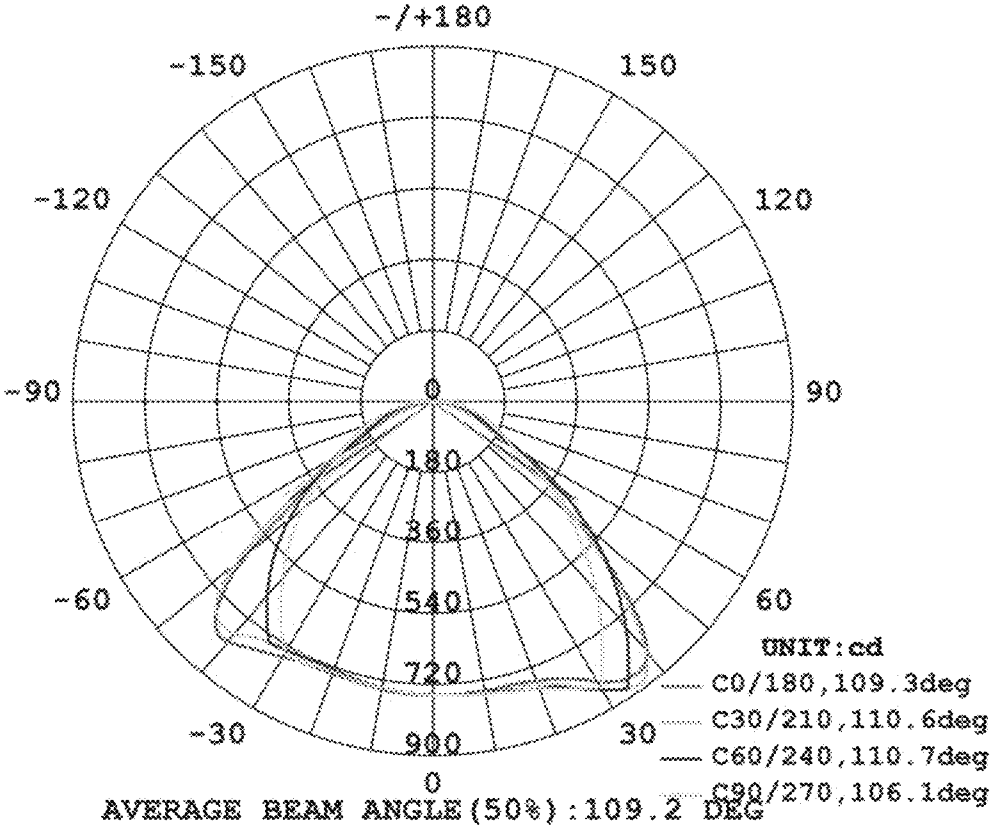
FIG. 14 is the measured light distribution curve when the lamp is in the third matching position in the preferred embodiment of the present disclosure.
Figure 21:
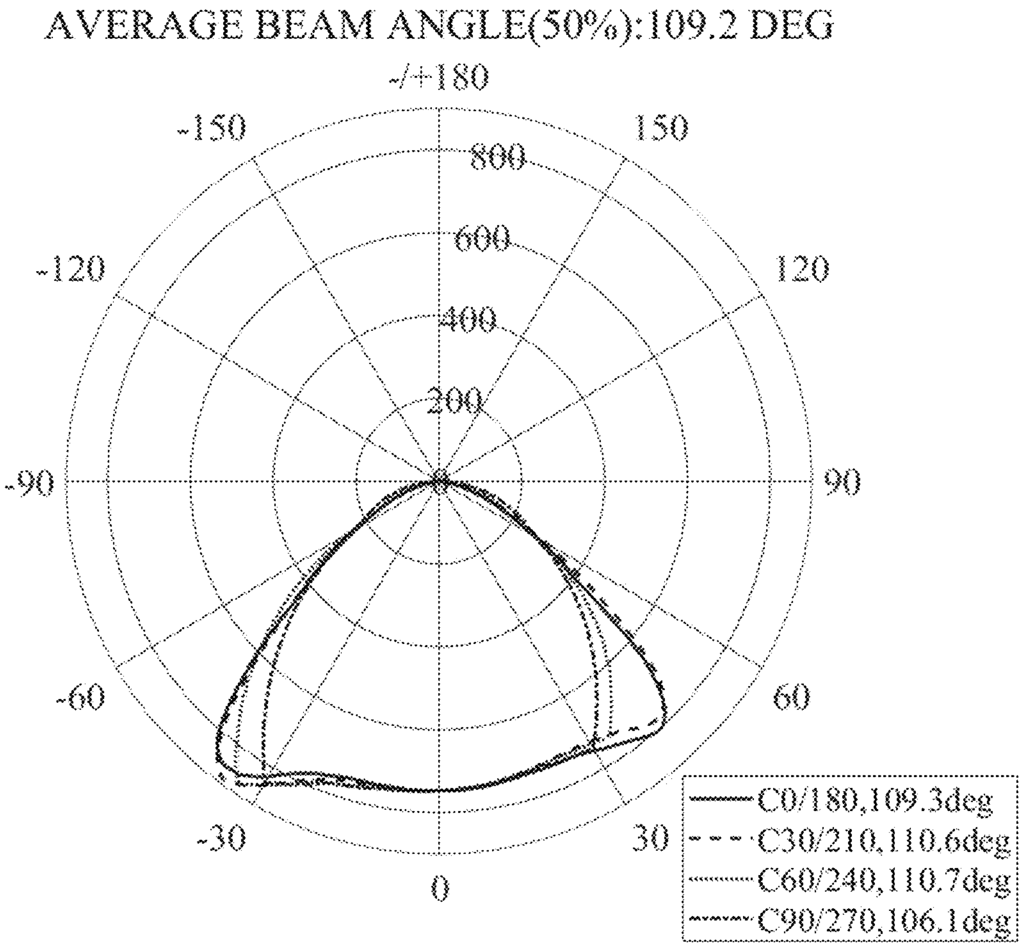
FIG. 21 is a measured light distribution curve when the lamp is in the third matching position in the preferred embodiment of the present disclosure, which aligns with the measured light distribution curve shown in FIG. 14.

When the matching angle between the light source board 2 and the lens 1 is −60° (i.e., the third matching position), the lamp bead 23 is located inside the middle of the second arc-shaped surface of lens 1. The measured light distribution curve are shown in FIG. 14 and FIG. 21, and the average light output angle is 109.2°.

In this embodiment, the spiral lens portion 12 is provided on the lens 1, and the spiral lens strip 121 (i.e., having a shape similar to a mosquito-repellent-coil) is provided. The first light entering surface 122, the second light entering surface 123, the first light exiting surface 124, and the second light exiting surface 126 of different curvature values are combined to generate different beam angles. A relative position of the first light entering surface 122, the second light entering surface 123, the first light exiting surface 124, the second light exiting surface 126, and the spiral lamp bead strip 22 are changed by the rotation of the spiral lens portion 12, so as to achieve an adjustment of the light emitting angle of the lamp 3. When the lens 1 is rotated, the light emitting angle of the lamp 3 also changes accordingly, thereby achieving a stepless adjustment of the light emitting angle.

In this embodiment, in order to better quantitatively describe a relationship between the spiral lens strip 121 and the receiving groove 125, referring to FIG. 15, a spiral line will be described by a formula. The general formula for the spiral line is:

$$r = \frac{B}{2\pi} * (\theta - \theta_0) + A_0 \tag{1}$$

In the formula (1), r is a distance between a point on the spiral line in polar coordinates and an origin, B is a pitch, $\theta_0$ is an initial angle, and $A_0$ represents a distance between a starting point of the spiral line and the origin.

Figure 15:
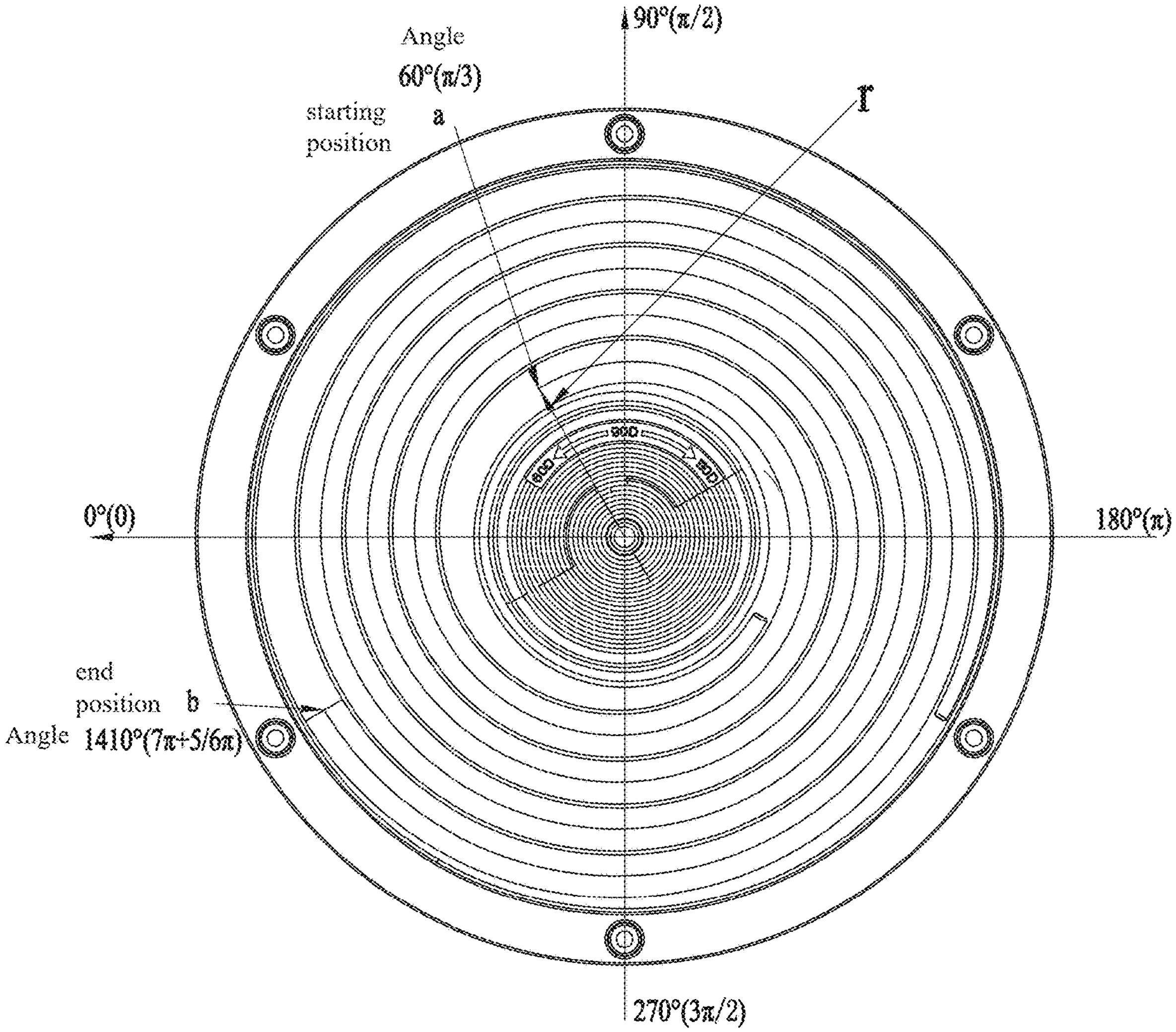
FIG. 15 is a spiral line corresponding to the first matching position in the preferred embodiment of the present disclosure.

The spiral line in FIG. 15 is a vertical projection of the middle of the spiral lens strip 121 in the first matching position (i.e., the second rotation position). That is, the spiral line is formed. A starting position of the spiral line is point a, and an end position is point b. An angle at the starting position is 60° (π/3), and an angle at the end position is 1410° (7π+5/6π). The expression of the spiral line of the spiral lens strip 121 in FIG. 15 is:

$$r_1 = \frac{B}{2\pi} * \left(\theta - \frac{\pi}{3}\right) + A_0\left(\frac{\pi}{3} \le \theta \le 7\frac{5\pi}{6}\right) \tag{2}$$

Figure 16:
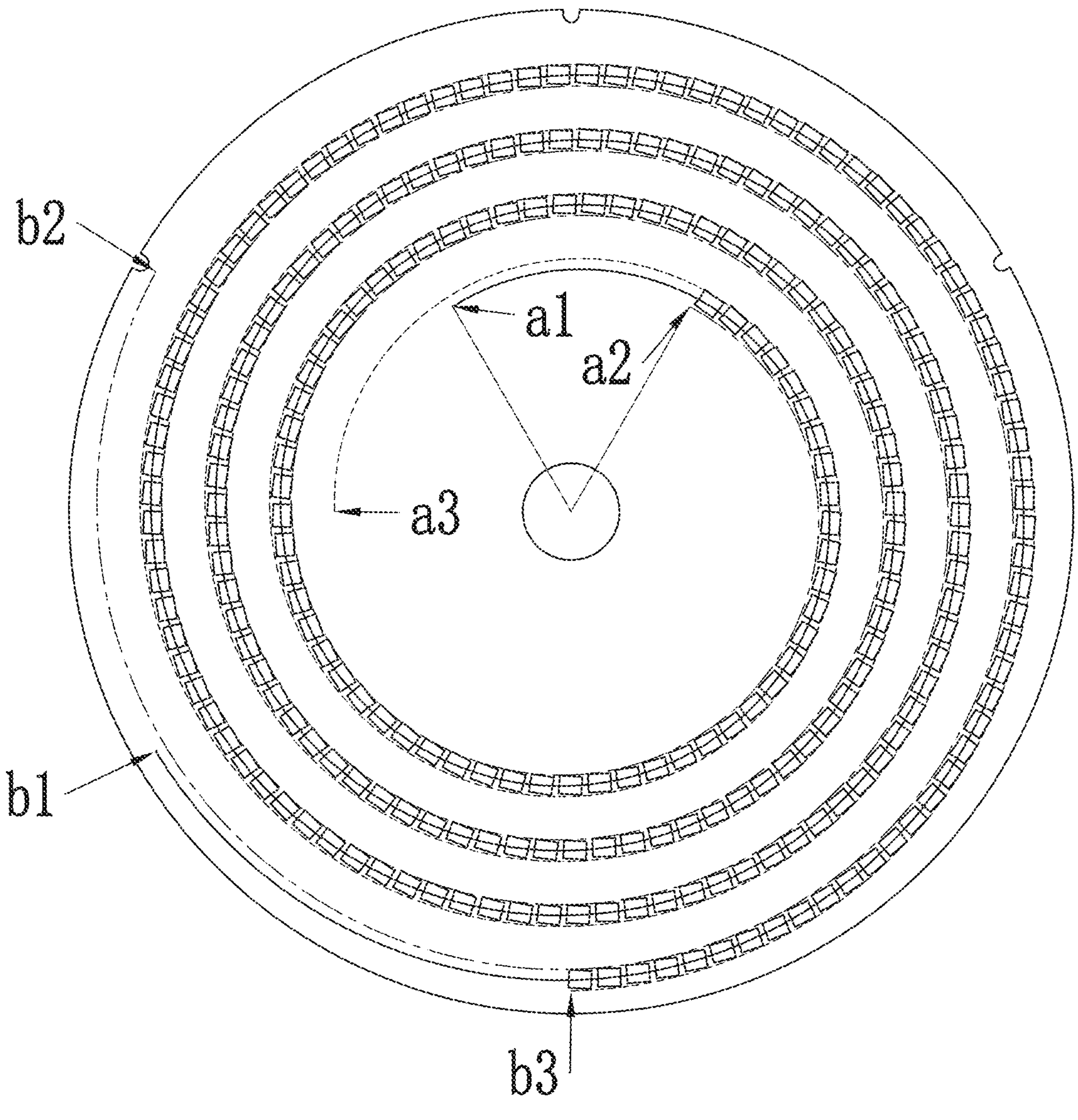
FIG. 16 is spiral lines corresponding to the first, second, and third matching positions in the preferred embodiment of the present disclosure.
Figure 17:
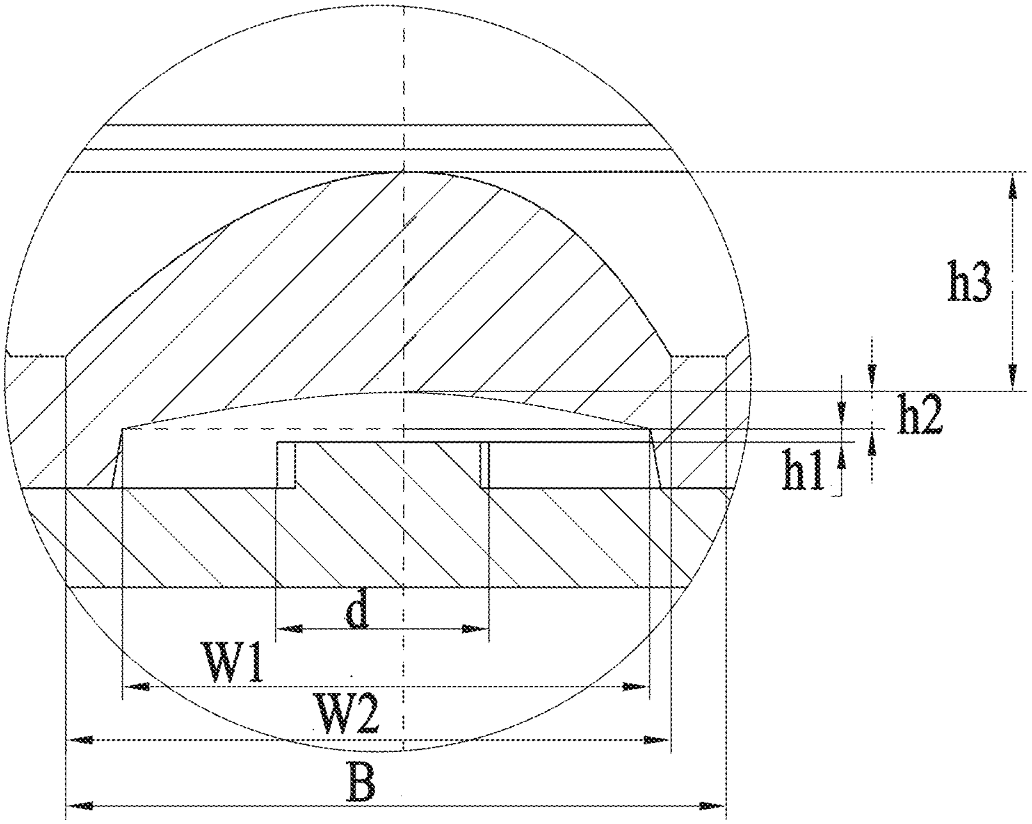
FIG. 17 is structural dimensions corresponding to the first matching position in the preferred embodiment of the present disclosure.

A solid spiral line a1-b1 in FIG. 16 is the same as a trajectory of the spiral line in the first matching position in FIG. 15, a dotted spiral line a3-b3 corresponds to a position of the third matching position, and a dotted spiral line a2-b2 corresponds to a position of the second matching position.

As can be seen from FIG. 16, when the lens 1 is rotated clockwise by 60°, a trajectory of the solid spiral line a1-b1 becomes the dotted spiral line a2-b2, and the expression of the dotted spiral line a2-b2 is:

$$r_2 = \frac{B}{2\pi} * \left(\theta - \frac{2\pi}{3}\right) + A_0\left(\frac{2\pi}{3} \le \theta \le 7\frac{5\pi}{6}\right) \tag{3}$$

As can be seen from FIG. 16, when the lens 1 is rotated counterclockwise by 60°, the trajectory of the solid spiral line a1-b1 becomes the dotted spiral line a3-b3, and the expression of the dotted spiral line a3-b3is:

$$r_3 = \frac{B}{2\pi} * \theta + A_0\left(\frac{2\pi}{3} \le \theta \le 7\frac{5\pi}{6}\right) \tag{4}$$

A starting angle position of the spiral lamp bead strip 22 is $$\frac{2}{3}\pi,$$

an ending angle position of the spiral lamp bead strip 22 is $$\frac{15}{2}\pi,$$

and an angle range of the spiral lamp bead strip 22 is $$\left[\frac{2}{3}\pi, \frac{15}{2}\pi\right].$$

For a same position of the plurality of lamp beads 23, i.e. θ=θ1, a difference between $r_2$ and $r_1$ is:

$$r_2 - r_1 = \left[\frac{B}{2\pi} * \left(\theta_1 - \frac{2\pi}{3}\right) + A_0\right] - \left[\frac{B}{2\pi} * \left(\theta_1 - \frac{\pi}{3}\right) + A_0\right] = -\frac{B}{6} \tag{5}$$

Similarly, a difference between $r_3$ and $r_1$ is:

$$r_3 - r_1 = \left[\frac{B}{2\pi} * \theta_1 + A_0\right] - \left[\frac{B}{2\pi} * \left(\theta_1 - \frac{\pi}{3}\right) + A_0\right] = \frac{B}{6} \tag{6}$$

Therefore, when the spiral lens strip 121 is rotated from −60° to 60°, based on the position of the plurality of lamp beads 23 at the first matching position, a radial movement range of the plurality of lamp beads 23 is $$\left[-\frac{B}{6}, \frac{B}{6}\right],$$

assuming that a width of each of the plurality of lamp beads 23 is d, a width of the receiving groove 125 is W1, and the plurality of lamp beads 23 are located at a middle of the receiving groove 125. In order to ensure that the plurality of lamp beads does not touch the outer wall 128 or the inner wall 129 of the receiving groove 125 within a rotation range of −60° to 60°, it is necessary to meet the following conditions:

$$\frac{B}{6}+\frac{d}{2}\leq\frac{W1}{2} \tag{7}$$

In this embodiment, a minimum distance h1 between a top surface of the receiving groove 125 (i.e., the surface formed by the connecting imaginary line 127 connecting the inner wall 129 and the outer wall 128 of the receiving groove 125) and the light emitting surfaces of the plurality of lamp beads 23 is ≥0.2 mm; a recessed depth h2 of the first light entering surface 122 and the second light entering surface 123 is ≤one-third of the width W1 of the receiving groove 125

$$\left(h2\leq\frac{1}{3}W1\right);$$

a protruding height h3 of the first light exiting surface 124 and the second light exiting surface 126 is ≥3 times the recessed depth h2 of the first light entering surface 122 and the second light entering surface 123 (h3≥3·h2); and a width W2 of the first light exiting surface 124 and the second light exiting surface 126 is ≥half of the pitch B of the spiral lens strip 121

$$\left(W2\geq\frac{1}{2}B\right).$$

A sum of half the width of each of the plurality of lamp beads 23 and an offset distance $$\frac{1}{6}B$$

of the plurality of lamp beads 23 when the lens is rotated clockwise by 60° is less than the width W1 of the receiving groove 125, and a sum of half the width of each of the plurality of lamp beads 23 and the offset distance $$\frac{1}{6}B$$

of the plurality of lamp beads 23 when the lens is rotated counterclockwise by 60° is less than the width W1 of the receiving groove 125, that is $$\frac{1}{2}d+\frac{1}{6}B\leq\frac{1}{2}W1.$$

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A lens with an adjustable light angle, wherein:

the lens is configured to be matched with a light source board, the lens comprises a lens outer portion, a spiral lens portion, and a lens middle cover portion, the spiral lens portion comprises a spiral lens strip, the light source board comprises a spiral lamp bead strip, the spiral lamp bead strip is configured to be matched with the spiral lens strip, the spiral lens strip comprises a light entering surface and a light exiting surface, the light entering surface faces the spiral lamp bead strip, the light entering surface comprises a receiving groove corresponding to a plurality of lamp beads of the spiral lamp bead strip, the light exiting surface is an arc-shaped surface, the light exiting surface is respectively divided into a first light exiting surface and a second light exiting surface respectively extending from a middle of the arc-shaped surface to two sides of the arc-shaped surface, a curvature value of the first light exiting surface is different from a curvature value of the second light exiting surface, the spiral lens portion is connected to the lens middle cover portion, the lens middle cover portion is configured to be rotated to drive the spiral lens portion to drive the spiral lens strip to be rotated synchronously, so that the spiral lens strip is rotated relative to the spiral lamp bead strip to enable the receiving groove to move relative to the plurality of lamp beads, and a position change of the plurality of lamp beads in the receiving groove allows light emitted by the plurality of lamp beads to be alternatively emitted from at least one of the first light exiting surface or the second light exiting surface.

2. The lens with the adjustable light angle according to claim 1, wherein:

a rotation of the spiral lens strip in a plane creates an illusion of a dynamic spiral movement, a rotation angle range of the spiral lens portion is −60° to 60°, the spiral lens strip is configured to be rotated counter-clockwise to correspond to a rotation angle of −60°, and the spiral lens strip is configured to be rotated clockwise to correspond to a rotation angle of 60°.

3. The lens with the adjustable light angle according to claim 2, wherein:

the lens middle cover portion comprises a first rotation position, a second rotation position, and a third rotation position, the second rotation position is a middle gear position, when the lens middle cover portion is rotated clockwise to correspond to the first rotation position, an inner wall of the receiving groove moves inward along a radial direction of the lens middle cover portion relative to the plurality of lamp beads, and when the lens middle cover portion is rotated counter-clockwise to correspond to the third rotation position, the inner wall of the receiving groove moves outward along the radial direction of the lens middle cover portion relative to the plurality of lamp beads.

4. The lens with the adjustable light angle according to claim 3, wherein:

the lens middle cover portion comprises gear position marks corresponding to the first rotation position, the second rotation position, and the third rotation position, and the lens middle cover portion comprises rotation direction marks.

5. The lens with the adjustable light angle according to claim 3, wherein:

when the lens middle cover portion is in the second rotation position, the plurality of lamp beads are located on or adjacent to a middle position of the receiving groove, when the lens middle cover portion is in the first rotation position, the plurality of lamp beads are located below the first light exiting surface, and when the lens middle cover portion is in the third rotation position, the plurality of lamp beads are located below the second light exiting surface.

6. The lens with the adjustable light angle according to claim 3, wherein:

arc-shaped protrusions corresponding to the first rotation position, the second rotation position, and the third rotation position are respectively provided on an outer edge of the spiral lens portion, arc-shaped positioning grooves are provided along an edge of the light source board, and when the lens is rotated, the arc-shaped protrusions respectively form a snap fit with the arc-shaped positioning grooves.

7. The lens with the adjustable light angle according to claim 2, wherein:

the receiving groove extending along a spiral path, and the receiving groove has an activity space for the plurality of lamp beads.

8. The lens with the adjustable light angle according to claim 7, wherein:

a minimum distance between a top surface of the receiving groove and light emitting surfaces of the plurality of lamp beads is greater than or equal to 0.2 mm.

9. The lens with the adjustable light angle according to claim 1, wherein:

the light entering surface and the light exiting surface are different surfaces, and a curvature value of the light entering surface is smaller than a curvature value of the light exiting surface.

10. The lens with the adjustable light angle according to claim 9, wherein:

the light entering surface is a first arc-shaped surface, the light entering surface is respectively divided into a first light entering surface and a second light entering surface respectively extending from a middle of the first arc-shaped surface to two sides of the first arc-shaped surface, and the first light entering surface and the second light entering surface have different curvature values.

11. The lens with the adjustable light angle according to claim 10, wherein:

a recessed depth of the first light entering surface is less than or equal to one-third of a width of the receiving groove, a protruding height of the first light exiting surface and the second light exiting surface is greater than or equal to 3 times the recessed depth of the first light entering surface, and a width of the first light exiting surface and the second light exiting surface is greater than or equal to half of a pitch of the spiral lens strip.

12. The lens with the adjustable light angle according to claim 11, wherein:

a sum of half a width of each of the plurality of lamp beads and an offset distance of the plurality of lamp beads when the lens is rotated clockwise by 60° is less than the width of the receiving groove, and a sum of half the width of each of the plurality of lamp beads and the offset distance of the plurality of lamp beads when the lens is rotated counterclockwise by 60° is less than the width of the receiving groove.

13. The lens with the adjustable light angle according to claim 1, wherein:

the light entering surface is a flat surface.

14. A lamp, comprising:

a lamp body, the light source board, and the lens with the adjustable light angle according to claim 1, wherein:

the spiral lens portion is installed to correspond to the spiral lamp bead strip, and the lens is fixedly connected to the lamp body through the lens outer portion.

* * * * *